United States Patent [19]

Brinkmann et al.

[11] Patent Number: 4,726,267
[45] Date of Patent: Feb. 23, 1988

[54] TAILSTOCK SLEEVE GUIDE FOR MACHINE TOOLS ESPECIALLY LATHES

[75] Inventors: Dirk Brinkmann, Lünen-Niederaden; Wilfried Reske, Schwerte, both of Fed. Rep. of Germany

[73] Assignee: Hoesch Maschinenfabrik Deutschland AG, Fed. Rep. of Germany

[21] Appl. No.: 879,804

[22] Filed: Jun. 27, 1986

[30] Foreign Application Priority Data

Jul. 4, 1985 [DE] Fed. Rep. of Germany ....... 8519451

[51] Int. Cl.⁴ .................. B23B 23/00; B23B 19/02
[52] U.S. Cl. ................................. 82/31; 82/30; 409/231; 384/29; 384/40
[58] Field of Search ............ 82/31, 30; 409/231, 409/239; 384/29, 30, 32, 40; 51/237 R

[56] References Cited

U.S. PATENT DOCUMENTS 3,735,460   5/1973   Crachy et al. ................... 82/30

FOREIGN PATENT DOCUMENTS 641447    5/1962   Canada .......................... 384/40
1750244   1/1971   Fed. Rep. of Germany ........ 384/40
2010460  12/1979   Fed. Rep. of Germany ......... 82/31

*Primary Examiner*—Nicholas P. Godici
*Assistant Examiner*—Edward Brown
*Attorney, Agent, or Firm*—McCormick, Paulding & Huber

[57] ABSTRACT

A tailstock sleeve guide for lathes comprising two axially spaced guide sleeves which guide the tailstock sleeve and are inserted into a bore of a housing. Adjustment of the radial guide clearance of the tailstock sleeve is effected by axially compressing the guide sleeves. Between the two guide sleeves (4, 5) a claming means (6) act thereon to minimize the time required for the adjustment of the two guide sleeves to identical guide clearance of the tailstock sleeve.

1 Claim, 2 Drawing Figures

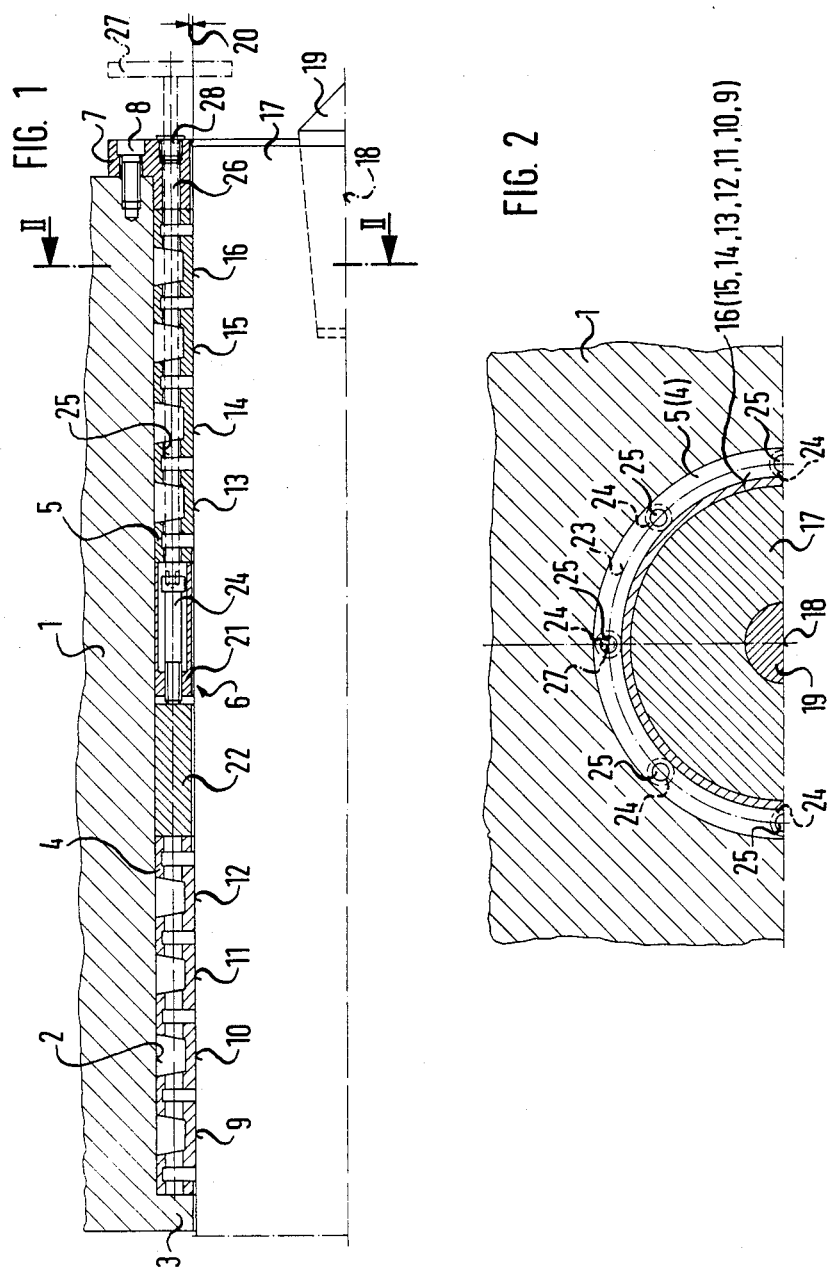

TAILSTOCK SLEEVE GUIDE FOR MACHINE TOOLS ESPECIALLY LATHES

BACKGROUND OF THE INVENTION

The invention relates to an adjustable sleeve guide for machine tools, more especially an adjustable tailstock sleeve guide for lathes, having two axially spaced guide sleeves guiding the tailstock sleeve and inserted into a bore of a housing. The adjustment of the radial guide clearance of the tailstock sleeve is effected by axially compressing the guide sleeves.

For adjusting the radial guide clearance of the tailstock guide, guides of the aforementioned type contain two clamping means actuable by hand and each of which independently effects axial compression of a guide sleeve.

It has been found in practice that the time required for adjusting the two guide sleeves to the same guide clearance of the tailstock sleeve is relatively long.

SUMMARY OF THE INVENTION

The present invention is directed to further developing a tailstock sleeve guide of the type mentioned so that the time required for adjusting two axial guide sleeves to identical guide clearance of the tailstock sleeve can be kept very small.

According to the invention this problem is solved by disposing a clamping means between the two guide sleeves.

In further development of the invention the clamping means comprises a clamping ring and a support ring.

Preferably, the clamping ring is constructed with a plurality of axial clamping screws acting in the direction of the tailstock sleeve axis.

The guide sleeve adjacent the clamping ring comprises bores for insertion of a key drivingly engageable with the clamping screws.

Preferably, the two guide sleeves are identical.

BRIEF DESCRIPTION OF THE DRAWINGS

FIG. 1 is a partial longitudinal section through a tailstock sleeve guide of a wheelset turning machine, FIG. 2 is a partial section along the line II—II of FIG. 1.

DETAILED DESCRIPTION OF PREFERRED EMBODIMENTS

A tailstock housing 1 is provided with a cylindrical bore 2 and an annular shoulder 3.

The bore 2 serves to receive and center two axially spaced guide sleeves 4,5. A clamping means 6 is disposed between the guide sleeves 4,5 and a Flange 7 is provided rightwardly of sleeve 5.

The flange 7 is attached by means of screws 8 to the tailstock housing 1.

The guide sleeves 4,5 each comprise four cylindrical guide faces 9, 10, 11, 12, 13, 14, 15, 16 which guide a cylindrical tailstock sleeve or spindle 17.

The tailstock sleeve or spindle 17 is displaceable in the direction of the tailstock sleeve axis 18.

A back center inserted into the tailstock sleeve 17 is designated by 19.

The adjustment of the radial guide clearance 20 of the tailstock sleeve 17 is accomplished by the clamping means 6. The latter effects a compressing of the guide sleeves 4,5 in the direction of the tailstock sleeve axis 18 and thus a reduction of the diameter of the cylindrical guide faces 9, 10, 11, 12, 13, 14, 15, 16.

The clamping means 6 is made up of a clamping ring 21, a support ring 22 and eight clamping screws 24 uniformly distributed circumaxially along circle 23.

Associated with the eight clamping screws 24 are eight coaxial passage bores 25 in the clamping sleeve 5 and eight coaxial holes 26 in the flange 7. Key 27 is insertable selectively in the holes 26 and bores 25 to drivingly engage the clamping screws 24.

The eight holes 26 of the flange 7 are each adapted to receive a removable plug 28.

Because of the spring characteristics, the two guide sleeves 4,5 are identical.

We claim:

1. An adjustable sleeve guide for tailstocks of lathes and the like comprising; two axially spaced substantially identical guide sleeves for guiding a tailstock sleeve, a housing having a bore receiving the guide sleeves, a clamping means in the bore between the sleeve guides and comprising a plurality of axially extending screws urging the guides in opposite axial directions, a ring attached to the housing adjacent one end of the bore and securing one guide sleeve against axial movement, said ring and said one guide sleeve being provided with aligned openings providing access to said axially extending screws, and a key selectively drivingly engageable with said screws on entry into the associated access opening.

* * * * *